(12) United States Patent
Scheid

(10) Patent No.: US 10,783,724 B2
(45) Date of Patent: *Sep. 22, 2020

(54) VEHICLE DATA COLLECTION SYSTEM AND METHOD

(71) Applicant: United Technologies Corporation, Farmington, CT (US)

(72) Inventor: Paul Raymond Scheid, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 517 days.

This patent is subject to a terminal disclaimer.

(21) Appl. No.: 15/344,634

(22) Filed: Nov. 7, 2016

(65) Prior Publication Data

US 2018/0130269 A1 May 10, 2018

(51) Int. Cl.
| | |
|---|---|
| G07C 5/00 | (2006.01) |
| G07C 5/08 | (2006.01) |
| G06Q 10/00 | (2012.01) |
| H04L 29/08 | (2006.01) |
| B64F 5/60 | (2017.01) |

(Continued)

(52) U.S. Cl.
CPC ............ G07C 5/085 (2013.01); B64F 5/60 (2017.01); G06Q 10/20 (2013.01); G07C 5/00 (2013.01); G07C 5/008 (2013.01); G07C 5/0816 (2013.01); H04L 67/12 (2013.01); H04L 67/34 (2013.01); H04W 4/42 (2018.02); H04W 4/44 (2018.02); B64D 2045/0085 (2013.01)

(58) Field of Classification Search
CPC .. B64D 2045/0085; B64F 5/0045; B64F 5/60; G06Q 10/20; G07C 5/00; G07C 5/008; G07C 5/0816; G07C 5/085; G07C 5/0808; H04L 67/12; H04L 67/34
USPC ................................................ 701/29.3–29.6
See application file for complete search history.

(56) References Cited

U.S. PATENT DOCUMENTS

| | | | |
|---|---|---|---|
| 8,019,501 B2 * | 9/2011 | Breed ...................... | B60J 10/00 701/31.9 |
| 8,209,300 B2 * | 6/2012 | Malkowicz ....... | G06F 17/30551 702/184 |

(Continued)

OTHER PUBLICATIONS

European Search Report Issued in EP Application No. 17199962.6, dated Apr. 13, 2018, 9 Pages.

*Primary Examiner* — Khoi H Tran
*Assistant Examiner* — B M M Hannan
(74) *Attorney, Agent, or Firm* — Cantor Colburn LLP

(57) ABSTRACT

A method of data collection for a vehicle includes defining a vehicle build configuration based on individual build configurations of one or more vehicle systems, and defining a data acquisition definition file at a data collection and reporting hub based on the vehicle build configuration. The data acquisition definition file includes parameters and measurements to be performed by a data acquisition system located at the vehicle. The data acquisition definition file is requested by the data acquisition system and the data acquisition definition file is communicated to the data acquisition system via a two way electronic communication link between the data collection and reporting hub following the request from the data acquisition system. Vehicle data is collected at the data acquisition system based on the data acquisition definition file.

15 Claims, 2 Drawing Sheets

(51) Int. Cl.
*H04W 4/42* (2018.01)
*H04W 4/44* (2018.01)
*B64D 45/00* (2006.01)

(56) References Cited

U.S. PATENT DOCUMENTS

| | | | |
|---|---|---|---|
| 8,255,112 B2* | 8/2012 | Conzachi | B64F 5/60 |
| | | | 701/29.1 |
| 9,407,635 B2* | 8/2016 | Angus | H04L 63/0428 |
| 9,542,180 B2* | 1/2017 | Angus | G06F 8/71 |
| 10,399,706 B1* | 9/2019 | Hanlon | G06N 5/02 |
| 2004/0106404 A1* | 6/2004 | Gould | B64D 47/00 |
| | | | 455/431 |
| 2006/0005016 A1* | 1/2006 | Lee | G06F 8/64 |
| | | | 713/164 |
| 2007/0114280 A1* | 5/2007 | Coop | G06Q 50/30 |
| | | | 235/385 |
| 2007/0198666 A1* | 8/2007 | Hoyes | H04L 67/125 |
| | | | 709/220 |
| 2008/0126111 A1* | 5/2008 | Loda | H04L 67/1095 |
| | | | 701/1 |
| 2009/0138874 A1* | 5/2009 | Beck | G06F 8/61 |
| | | | 717/173 |
| 2009/0150022 A1* | 6/2009 | McMillin | G06Q 10/06 |
| | | | 701/33.4 |
| 2009/0300595 A1* | 12/2009 | Moran | G06F 8/65 |
| | | | 717/170 |
| 2010/0082702 A1* | 4/2010 | Ramanathan | G07C 5/008 |
| | | | 707/803 |
| 2013/0304276 A1* | 11/2013 | Flies | G07C 5/085 |
| | | | 701/1 |
| 2016/0086391 A1* | 3/2016 | Ricci | G07C 5/008 |
| | | | 701/29.3 |
| 2016/0371481 A1* | 12/2016 | Miyake | G06F 21/445 |
| 2017/0138745 A1* | 5/2017 | Vasek | G01C 21/34 |

* cited by examiner

VEHICLE DATA COLLECTION SYSTEM AND METHOD

BACKGROUND

The present disclosure relates to vehicles and vehicle systems, and more particularly to data collection and reporting from vehicle and vehicle systems.

Vehicle original equipment manufacturers (OEMs), such as aircraft manufacturers or engine manufacturers, collect data from their equipment in service during the equipment operation by users to monitor health of the equipment and to, for example, make design improvements based on the collected data. To collect the desired data, OEM's define OEM vehicle data reports. Vehicle operators, such as airlines or cargo companies, similarly define operator data reports to understand the health of their fleet of vehicles.

The vehicles include systems such as engines, operational control systems, etc., that are operated via software installed at computers operably connected to the systems. The computers periodically receive software updates while the vehicle is in the field, and many times these software changes affect the operational status and health monitoring data collected and reported in the data reports, reducing the accuracy and usefulness of the collected data and the data reports.

Currently, when software updates are performed to vehicle systems, manual operations are necessary to ensure the data reports are configured to match the software configuration onboard the vehicle and read by the vehicle systems, so that the data is correctly collected and reported.

SUMMARY

In one embodiment, a method of data collection for a vehicle includes defining a vehicle build configuration based on individual build configurations of one or more vehicle systems and defining a data acquisition definition file at a data collection and reporting hub based on the vehicle build configuration, the data acquisition definition file including parameters and measurements to be performed by a data acquisition system disposed at the vehicle. A data acquisition definition file is requested by the data acquisition system, the data acquisition definition file at a data collection and reporting hub based on the vehicle build configuration, the data acquisition definition file including parameters and measurements to be performed by a data acquisition system disposed at the vehicle. The data acquisition definition file is communicated to the data acquisition system via a two way electronic communication link between the data collection and reporting hub following the request from the data acquisition system, and vehicle data is collected at the data acquisition system based on the data acquisition definition file.

Additionally or alternatively, in this or other embodiments the method includes updating the vehicle build configuration to an updated vehicle build configuration by revising at least one vehicle system of the one or more vehicle systems, and detecting the revision of the at least one vehicle system at the data acquisition system.

Additionally or alternatively, in this or other embodiments the method includes defining an updated data acquisition definition file at the data collection and reporting hub corresponding to the updated vehicle build configuration.

Additionally or alternatively, in this or other embodiments the method includes requesting, via the data acquisition system, communication of the updated data acquisition definition file from the data collection and reporting hub to the data acquisition system.

Additionally or alternatively, in this or other embodiments the method includes communicating the update data acquisition definition file from the data collection and reporting hub to the data acquisition system.

Additionally or alternatively, in this or other embodiments the method includes communicating an alert from the data acquisition system to the data collection and reporting hub if the requested updated data acquisition definition file is not available at the data collection and reporting hub.

Additionally or alternatively, in this or other embodiments the method includes taking one or more actions at the data collection and reporting hub in response to the communicated alert.

Additionally or alternatively, in this or other embodiments the one or more actions includes providing the requested data acquisition definition file to the data collection and reporting hub, stopping collection of data, or proceeding with data collection using an available data acquisition definition file.

Additionally or alternatively, in this or other embodiments the one or more vehicle systems include one or more of an engine system, an auxiliary power unit system, an environmental control system, a flight control system, and/or a hydraulic system.

Additionally or alternatively, in this or other embodiments the vehicle build configuration is defined by hardware and/or software versions disposed at the one or more vehicle systems.

Additionally or alternatively, in this or other embodiments the vehicle is an aircraft.

In another embodiment, a data collection and reporting system for a vehicle includes a data acquisition system located at a vehicle configured to detect a vehicle build configuration based on individual build configurations of one or more vehicle systems of the vehicle, and a data collection and reporting hub having a data acquisition definition file defined thereat corresponding to the vehicle build configuration. The data acquisition definition file includes parameters and measurements to be performed by a data acquisition system located at the vehicle. The data acquisition system is configured to request the data acquisition definition file by the data acquisition system, and the data collection and reporting hub is configured to communicate the data acquisition definition file to the data acquisition system via a two way electronic communication link between the data collection and reporting hub when requested by the data acquisition system.

Additionally or alternatively, in this or other embodiments the data acquisition system is configured to detect the revision of the at least one vehicle system at the data acquisition system. The revision of the at least one vehicle system results in updating the vehicle build configuration to an updated vehicle build configuration.

Additionally or alternatively, in this or other embodiments the data acquisition system is configured to request an updated data acquisition definition file at the data collection and reporting hub corresponding to the updated vehicle build configuration.

Additionally or alternatively, in this or other embodiments the data collection and reporting hub is configured to communicate the updated data acquisition definition file from the data collection and reporting hub to the data acquisition system automatically upon request by the data acquisition system.

Additionally or alternatively, in this or other embodiments the data acquisition system is configured to communicate an alert from the data acquisition system to the data collection and reporting hub if the requested updated data acquisition definition file is not available at the data collection and reporting hub.

Additionally or alternatively, in this or other embodiments the one or more vehicle systems include one or more of an engine system, an auxiliary power unit system, an environmental control system, a flight control system, and/or a hydraulic system.

Additionally or alternatively, in this or other embodiments the vehicle build configuration is defined by hardware and/or software versions disposed at the one or more vehicle systems.

Additionally or alternatively, in this or other embodiments the vehicle is an aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
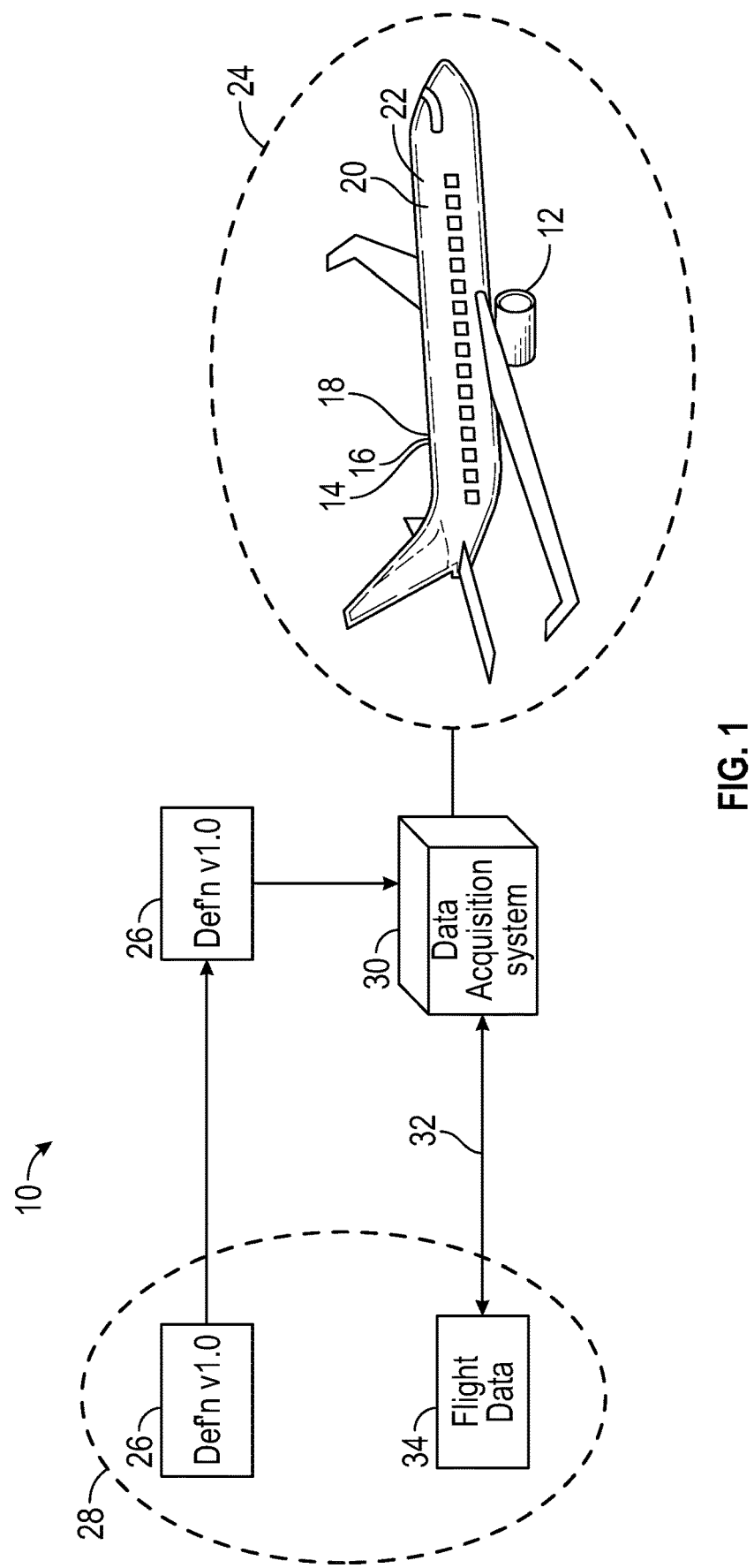
FIG. 1 is a schematic illustration of a data collection and reporting system.

Shown in FIG. 1 is a schematic view of a vehicle health data collection system 10. The data collection system 10 collects and reports system data from one or more systems of a vehicle, for example, aircraft 12. While the description provided herein is in the context of an aircraft 12, one skilled in the art will readily appreciate that the present disclosure may be readily applied to other vehicles, for example, automobiles, trucks, locomotives or trains, ships or other vehicles. The vehicle systems include, for example, engine systems 14, auxiliary power unit systems 16, environmental control systems 18, flight control systems 20, and/or hydraulic systems 22. It is to be appreciated that these vehicle systems are merely exemplary, and the reported system data may include data from other vehicle systems.

The configuration of each system, both hardware and software, defines a system build configuration for each particular vehicle system, while a collection of these system build configurations in the aircraft 12 together define a vehicle build configuration 24. For a particular vehicle build configuration 24, a data acquisition definition file 26 is defined based on input from, for example, design, structural, and performance engineers. The data acquisition definition file 26 specifies what vehicle system data is to be collected and defines report structures for reporting of the vehicle system data.

The data acquisition definition file 26 is defined at a data collection and reporting hub 28, and is communicated to a data acquisition system 30 onboard the aircraft 12. The data collection and reporting hub 28 is connected to communicate with the aircraft 12, specifically with the data acquisition system 30 via a two-way electronic connection 32 with the aircraft 12. In some embodiments, the electronic connection 32 is wireless via, for example, a Wi-Fi or cellular connection or similarly capable wireless technology. The data acquisition system 30 is connected to the other vehicle systems, such as the engine systems 14, auxiliary power unit systems 16, environmental control systems 18, flight control systems 20, and/or hydraulic systems 22 and collects data therefrom as defined by the data acquisition definition file 26.

Through the collection of data per the data acquisition definition file 26, the data acquisition system 30 generates one or more flight data files 34 which are communicated to the data collection and reporting hub 28 via the two-way electronic connection 32.

Periodically, one or more of the vehicle systems are changed or updated, either via changes in hardware and/or changes in software. The system and method for coordinating the vehicle build configuration 24 with the data acquisition definition file 26 when the one or more vehicle systems are changed or updated will now be described by way of example, with reference to FIG. 2.

Figure 2:
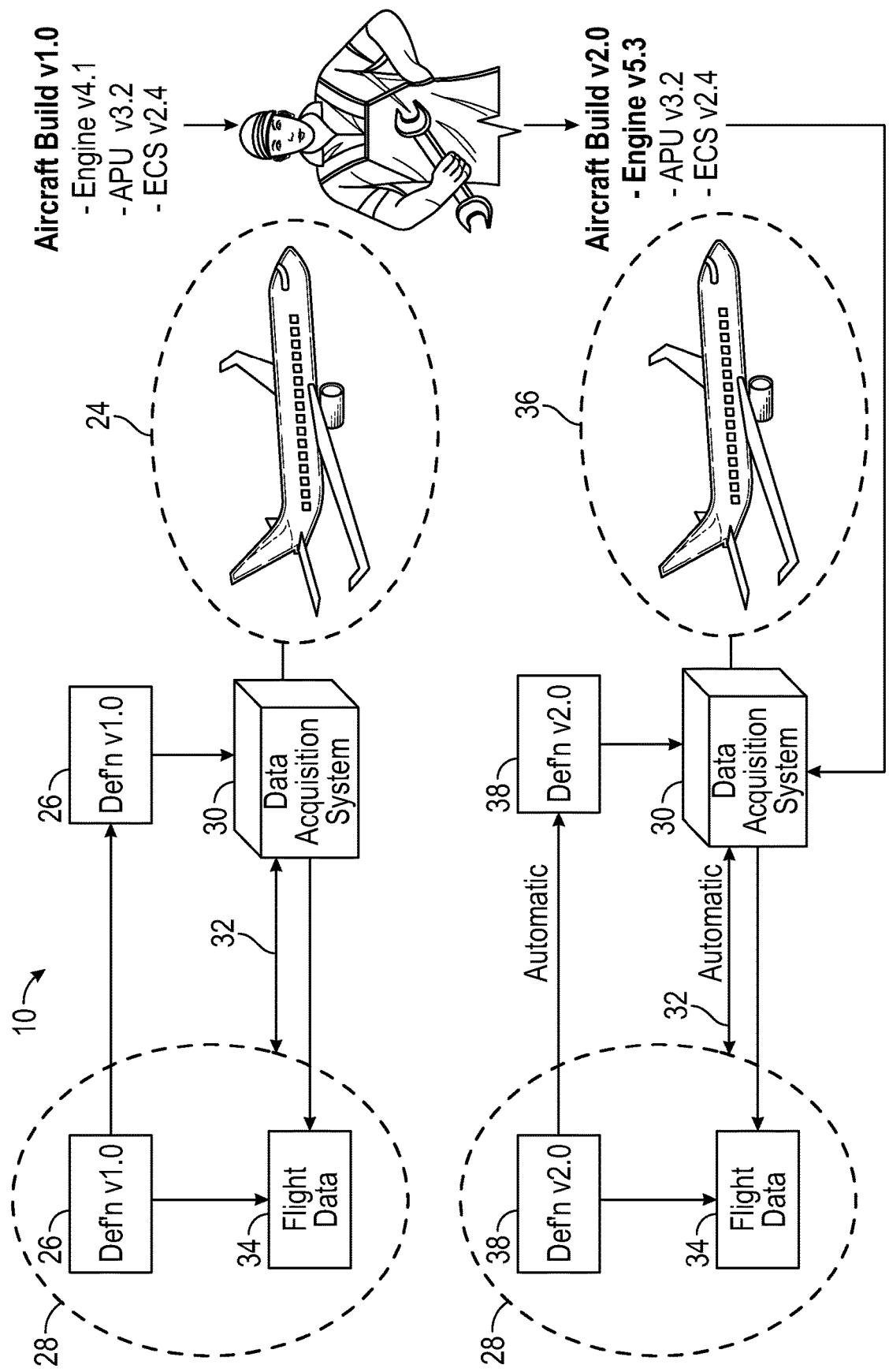
FIG. 2 is a schematic illustration of a method for updating the data collection and reporting system.

In the example shown in FIG. 2, as a baseline configuration the vehicle build configuration 24 is v1.0, as is the data acquisition definition file 26. One or more of the vehicle systems are updated, in this example, the engine systems 14 from engine v4.1 to engine v5.3. This change to the engine systems 14 drives a change from vehicle build configuration 24 v1.0 to updated vehicle build configuration 36 v2.0.

Simultaneous with, or either before or after the update to vehicle build configuration 36, the data acquisition definition file 26 v1.0 is also updated to data acquisition definition file 38 v2.0 by engineers or other personnel. The updated v2.0 data acquisition data file 38 resides at the data collection and reporting hub 28.

Once a mechanic or other personnel updates the one or more vehicle systems driving the change of vehicle build configuration 24 to vehicle build configuration 38, the data acquisition system 30 recognizes this change and communicates with the data collection and reporting hub 28 via the two-way electronic connection 32, and requests a data acquisition data file 26 corresponding to the vehicle build configuration 36, v2.0. If the data acquisition definition file 38 v2.0 exists at the data collection and reporting hub 28, the data acquisition system 30 pulls the data acquisition definition file 38 v2.0 from the data collection and reporting hub 28 for use in collection of data from the vehicle systems.

Alternatively, if the necessary data acquisition definition file 38 does not exist at the data collection and reporting hub 28, the data acquisition system 30 may communicate an alert to the data collection and reporting hub 28 communicating that the current vehicle build configuration 36 does not have a corresponding data acquisition definition file 38 available for use. This alert may prompt a user to either provide the correct data acquisition definition file 38, stop collection of data, proceed with data collection using an available data acquisition definition file 26, or to take other action in response to the alert.

Further, in some embodiments, once the necessary data acquisition definition file 38 is available, the file 38 is automatically transmitted or "pushed" to the data acquisition system 30.

This method and system for updating the data acquisition definition file 26 utilized at the data acquisition system 30 by the data acquisition system 30 detecting a change in the vehicle build configuration 24, determining that the change to the vehicle build configuration 24 may require an updated data acquisition definition file 26 to be compatible with the updated vehicle build configuration 36, and requesting the updated data acquisition definition file 38 automatically from the data hub 28 removes a need to manually update the data acquisition system 30, resulting in more accurate data collection by the data acquisition system 30 and the provision of more useful data to the OEM, vehicle operator, or other requesting parties.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of data collection for a vehicle comprising:
defining a vehicle build configuration of the vehicle based on individual build configurations of one or more systems of the vehicle;
defining a data acquisition definition file at a data collection and reporting hub based on the vehicle build configuration, the data acquisition definition file defining parameters and measurements to be performed for health monitoring of the vehicle by a data acquisition system disposed at the vehicle, the data collection and reporting hub located remotely from the vehicle;
requesting by the data acquisition system, the data acquisition definition file at the data collection and reporting hub based on the vehicle build configuration, the data acquisition definition file defining parameters and measurements to be performed by a data acquisition system disposed at the vehicle;
communicating the data acquisition definition file to the data acquisition system via a two way electronic communication link between the data collection and reporting hub and the data acquisition system following the request from the data acquisition system; and
collecting vehicle data at the data acquisition system based on the data acquisition definition file;
updating at least one system of the one or more systems of the vehicle;
updating the vehicle build configuration to an updated vehicle build configuration based on the updating of the at least one system;
automatically detecting the update of the at least one system of the one or more systems of the vehicle at the data acquisition system;
defining an updated data acquisition definition file at the data collection and reporting hub corresponding to the updated vehicle build configuration; and
requesting automatically, via the data acquisition system, communication of the updated data acquisition definition file from the data collection and reporting hub to the data acquisition system when the data acquisition system detects the updated vehicle build configuration.

2. The method of claim 1, further comprising communicating the update data acquisition definition file from the data collection and reporting hub to the data acquisition system.

3. The method of claim 1, further comprising communicating an alert from the data acquisition system to the data collection and reporting hub if the requested updated data acquisition definition file is not available at the data collection and reporting hub.

4. The method of claim 3, further comprising taking one or more actions at the data collection and reporting hub in response to the communicated alert.

5. The method of claim 4, wherein the one or more actions includes providing the requested data acquisition definition file to the data collection and reporting hub, stopping collection of data, or proceeding with data collection using an available data acquisition definition file.

6. The method of claim 1, wherein the one or more systems of the vehicle include one or more of an engine system, an auxiliary power unit system, an environmental control system, a flight control system, or a hydraulic system.

7. The method of claim 1, wherein the vehicle build configuration is defined by hardware versions disposed at the one or more systems of the vehicle.

8. The method of claim 1, wherein the vehicle is an aircraft.

9. A data collection and reporting system for a vehicle comprising:
a data acquisition system disposed at a vehicle configured to detect a vehicle build configuration of the vehicle based on individual build configurations of one or more systems of the vehicle;
a data collection and reporting hub located remotely from the vehicle and having a data acquisition definition file defined thereat corresponding to the vehicle build configuration, the data acquisition definition file defining parameters and measurements to be performed by a data acquisition system disposed at the vehicle for health monitoring of the systems of the vehicle;
wherein the data acquisition system is configured to automatically request the data acquisition definition file by the data acquisition system when the data acquisition system automatically detects a revision to the one or more systems of the vehicle, based on an update of at least one system of the one or more systems of the vehicle; and
wherein the data collection and reporting hub is configured to communicate the data acquisition definition file to the data acquisition system via a two way electronic communication link between the data collection and reporting hub when requested by the data acquisition system.

10. The data collection and reporting of claim 9, wherein the data acquisition system is configured to request an updated data acquisition definition file at the data collection and reporting hub corresponding to the updated vehicle build configuration.

11. The data collection and reporting of claim 10, wherein the data collection and reporting hub is configured to communicate the updated data acquisition definition file from the data collection and reporting hub to the data acquisition system automatically upon request by the data acquisition system.

12. The data collection and reporting of claim 10, wherein the data acquisition system is configured to communicate an alert from the data acquisition system to the data collection and reporting hub if the requested updated data acquisition definition file is not available at the data collection and reporting hub.

13. The data collection and reporting of claim 9, wherein the one or more systems include one or more of an engine system, an auxiliary power unit system, an environmental control system, a flight control system, or a hydraulic system.

14. The data collection and reporting of claim 9, wherein the vehicle build configuration is defined by hardware or software versions disposed at the one or more systems.

15. The data collection and reporting of claim 9, wherein the vehicle is an aircraft.

\* \* \* \* \*